Aug. 14, 1945.    M. SUTTON ET AL    2,382,815
HYDROCARBON CONVERSION SYSTEM
Filed Aug. 13, 1942    2 Sheets-Sheet 2
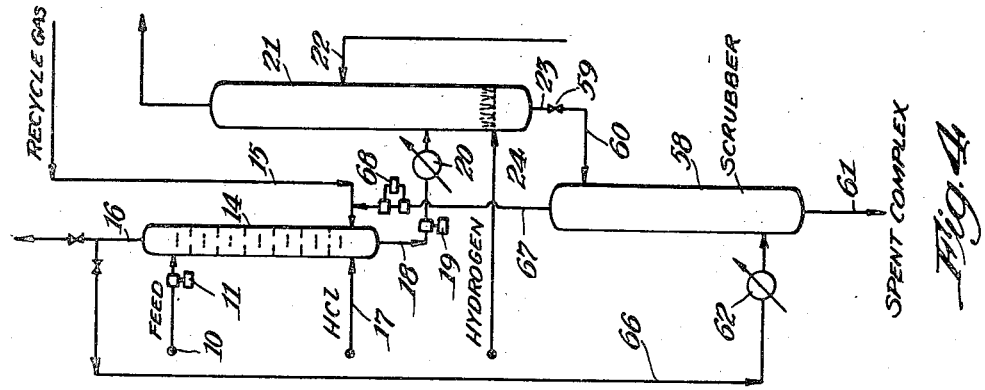
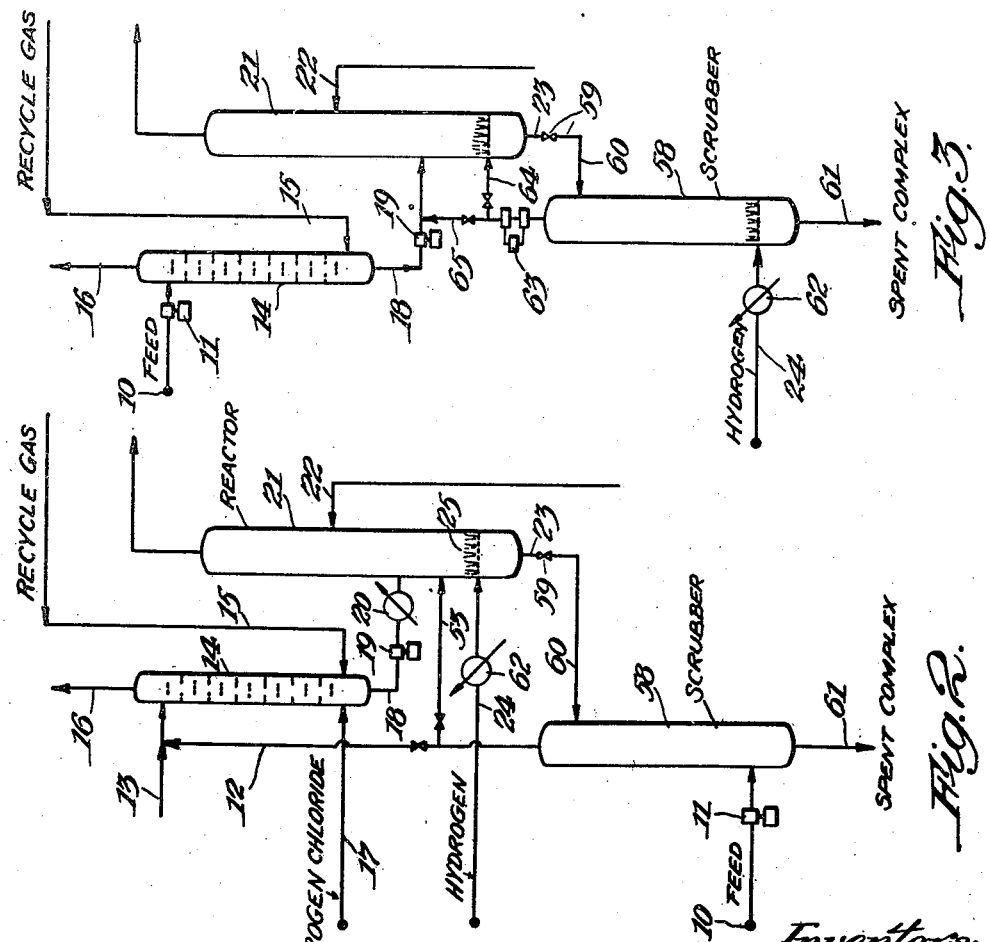
Inventors:
Mack Sutton,
Cecil W. Nysewander
By Donald E. Payne
Attorney Patented Aug. 14, 1945

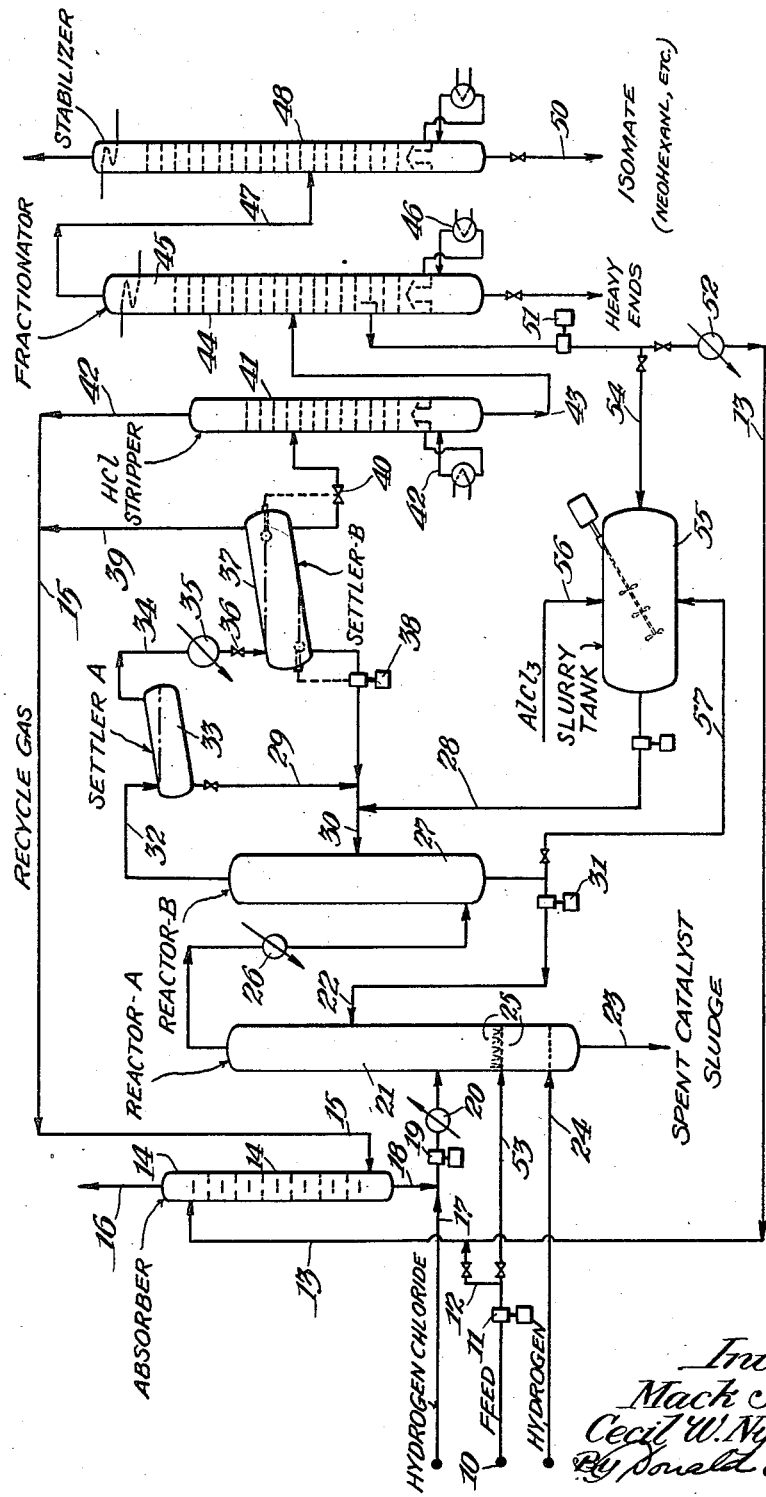

2,382,815

UNITED STATES PATENT OFFICE 2,382,815

HYDROCARBON CONVERSION SYSTEM

Mack Sutton, Hammond, and Cecil W. Nysewander, Highland, Ind., assignors to Standard Oil Company, Chicago, Ill., a corporation of Indiana Application August 13, 1942, Serial No. 454,656

10 Claims. (Cl. 260—683.5)

This invention relates to a hydrocarbon conversion system and it pertains more particularly to an isomerization system employing an aluminum halide catalyst and a hydrogen halide activator wherein hydrogen is employed for prolonging catalyst life, preventing excessive cracking, etc.

In a system for isomerizing $C_5$ and $C_6$ hydrocarbons by means of a liquid aluminum chloride-hydrocarbon complex activated by hydrogen chloride, catalyst life is prolonged and other beneficial effects are obtained by the addition of hydrogen. However, the catalyst complex eventually loses its activity and it is continuously or intermittently withdraw from the isomerization reactor. This withdrawn "spent complex" contains considerable amounts of hydrogen chloride. An object of our invention is to provide an improved method and means for recovering this valuable component from spent catalyst complex.

The hydrogen available in many refineries for use in the isomerization process is contaminated with small amounts of carbon monoxide. It has been found that such carbon monoxide is a serious catalyst poison and that as little as .05 pound or carbon monoxide is sufficient to poison or deactivate a pound of aluminum chloride in the catalyst complex. An object of our invention is to provide an improved method and means for removing carbon monoxide from the hydrogen stream entering an isomerization reactor.

A further object of the invention is to provide an improved method and means for simultaneously removing objectionable impurities from reactants introduced into an isomerization zone while recovering valuable components from spent complex removed from said reaction zone. A further object is to obtain this purification of introduced reactants and recovery of valuable catalyst and activator components at a minimum cost, i. e, with little or no additional capital plant cost and little or no additional operating expense. Other objects of the invention will be apparent as the detailed description thereof proceeds.

In a system for isomerizing a $C_5$—$C_6$ fraction of crude light naphtha at a temperature within the range of approximately 200 to 300° F., at a pressure within the approximate range of 500 to 1000 pounds per square inch, at a space velocity within the approximate range of .5 to 5 volumes of liquid feed per volume of liquid complex catalyst per hour using about 3 to 10%, for example about 6%, of hydrogen chloride by weight based on the hydrocarbon feed and introducing hydrogen at the rate of about 100 to 250 cubic feet per barrel, for example about 180 cubic feet per barrel of hydrocarbon charge, the catalyst life may be equivalent to about 30 gallons or more of charging stock per pound of aluminum chloride charged to the system. The system will preferably (but not necessarily) consist of a plurality of reaction towers, the fresh catalyst being charged to the tower from which the final product is removed and spent catalyst being withdrawn from the first tower into which charging stock is introduced. Although the aluminum chloride may be introduced into the system as a slurry in isomerized hydrocarbons or as a paste in active or "spent" hydrocarbon complex, it is converted in the system into a liquid aluminum chloride-hydrocarbon complex and the bulk of the catalyst in this reaction system is this liquid complex. Partially spent liquid complex may be withdrawn from a second tower to a first tower in the system and spent catalyst may be withdrawn from the first tower either continuously or intermittently.

When such system is operated under the conditions hereinabove stated it is found that the spent catalyst removed from the first tower contains large amounts of hydrogen chloride. When the catalyst addition rate is 1 pound of aluminum chloride per 30 gallons of charging stock or 1.4 pounds of aluminum chloride per barrel of charging stock, the spent catalyst carries away about .2 to .25 pound of hydrogen chloride per barrel of hydrocarbon charging stock. In accordance with our invention we substantially eliminate this loss of activator by stripping the spent catalyst with the incoming hydrogen or charging stock, or both.

The stripping may be effected in the bottom of the first reaction tower in a zone below the introduction of hydrogen chloride or it may be effected in a separate stripping zone and at a lower pressure than that which prevails in the reactor. We may first scrub the spent catalyst with charging stock as it leaves the reactor and then strip out additional valuable components with incoming hydrogen or we may employ the hydrogen stripping step before contacting the spent catalyst with incoming charging stock. The scrubbing of the spent catalyst with incoming charging stock serves the dual function of recovering hydrogen chloride from the spent catalyst and simultaneously removing from the charging stock any impurities such as sulfur compounds which would be deleterious to the catalyst in the isomerization zone. Similarly, the stripping of spent catalyst with introduced hydrogen not only effects the recovery of valuable hydrogen chloride but it also effects a purification of the hydrogen since the removed spent catalyst acts as a scrubbing catalyst for removing carbon monoxide and other poisons from said introduced hydrogen. This recovery of valuable components from spent catalysts and purification of materials entering the conversion zone is, in accordance with our invention, obtained by the extremely simple and inexpensive means of simply providing a counter-current stripping or scrubbing zone at the base of the first reaction tower.

The invention will be more clearly understood from the following detailed description read in conjunction with the accompanying drawings which form a part of the specification, similar parts being designated by similar reference characters in several figures, and in which:

Figure 1 is a schematic flow diagram of our isomerization system illustrating the countercurrent stripping and scrubbing steps below the reaction zone in the first isomerization reactor, Figure 2 is a schematic flow diagram illustrating a modified stripping and scrubbing system, the scrubbing with feed following the stripping with hydrogen, Figure 3 is a schematic flow diagram of still another system wherein the stripping with hydrogen is effected at relatively low pressure, and Figure 4 is a schematic flow diagram illustrating the use of recycling hydrogen for recovering valuable components from spent complex.

The charging stock for our process is preferably a substantially debutanized light naphtha fraction having a 90% point below 180° F. and preferably not higher than about 160° F. In other words, we prefer that our charging stock be substantially free from heptanes and that it consists essentially of a mixture of $C_5$ and $C_6$ paraffinic hydrocarbons with smaller amounts of naphthenes and a still smaller amount of aromatics. Where relatively pure $C_5$ and $C_6$ hydrocarbons are employed we prefer to add about 2 to 20% of naphthenes or about 1 to 5% of aromatics or a stock containing naphthenes or aromatics or both in order to repress cracking and prolong catalyst life. The charging stock may also be naphthenic in character, i. e., may boil substantially within the range of about 140 to 180° F. or higher in which case the reaction may be chiefly a conversion of alkyl cyclopentanes into alkyl cyclohexanes and cyclohexane. It is undesirable, however, that the charging stock contain large amounts of aromatics.

The charging stock from source 10 may be introduced by pump 11 through lines 12 and 13 to the upper part of absorber tower 14. Recycled gases containing hydrogen chloride are introduced at the base of this tower through line 15. Gases denuded of hydrogen chloride are removed from the top of the tower through line 16. Make-up hydrogen chloride may be added from line 17 either to the base of tower 14 or to line 18 leaving the base of this tower. The charging stock which now contains about 2 to 10%, for example about 6%, hydrogen chloride is introduced by pump 19 through heater 20 into the A reactor 21. Catalyst complex may be introduced into reactor 21 through line 22 and spent catalyst complex may be withdrawn from the reactor through line 23. This catalyst complex is preferably an aluminum halide hydrocarbon complex of the type described in U. S. Patent 2,260,279. Tower 21 may be 15 to 40 feet in height and the catalyst level may be about two-thirds to three-fourths of the distance from the tower bottom to the tower top. The reactor is preferably operated under a pressure of the order of about 850 pounds per square inch although pressures may range from a few hundred to several thousand pounds. The temperature in this reactor is preferably of the order of 250 to 300° F. and the space velocity employed may be about .5 to 5 volumes of liquid feed per hour per volume of liquid catalyst complex.

It should be noted that the hydrogen chloride is introduced into this system at an intermediate point in the reactor instead of at the bottom thereof. Hydrogen is introduced into the system through line 24 at a point substantially below the point at which hydrogen chloride is introduced thereto so that that portion of the reactor between the point of hydrogen chloride inlet and the point of hydrogen inlet many constitute a stripping zone 25. Hydrogen may be introduced into the system at the rate of about 50 to 300, usually about 150 to 200 cubic feet (measured standard conditions) per barrel of stock charged and this hydrogen may be produced from hydrocarbons in the refinery and thus be contaminated with small amounts of carbon monoxide. As the hydrogen passes upwardly in stripping zone 25 of reaction chamber 21 any carbon monoxide in the hydrogen is scrubbed out of it by the downflowing catalyst complex. At the same time the upflowing hydrogen acts as a stripping gas for recovering hydrogen chloride. By employing this countercurrent scrubbing zone at the base of the reactor we thus purify the introduced hydrogen by means of spent complex and we simultaneously recover from the spent complex valuable hydrogen chloride which would otherwise be withdrawn through line 23 with spent catalyst.

The total liquid-vapor-gas stream from the top of reactor 21 passes through cooler 26 to a low point in reactor 27. Make-up aluminum chloride from line 28 and recycled catalyst from line 29 are introduced into reactor 27 through line 30. Here again the catalyst level is maintained at a relatively high point in the reactor and the liquid-vapor-gas stream passes upwardly through the reactor at the space velocity hereinabove stated, the space velocity referring to the total catalyst in both reactors. Reactor 27 is preferably operated within the approximate temperature range of 200 to 250° F. Catalyst from the base of this reactor is withdrawn by pump 31 for introduction by line 22 to reactor 21.

The product stream from the top of reactor 27 is introduced by line 32 to warm settler 33 from which settled catalyst may be returned to reactor 27 by line 29 as hereinabove described. The product stream leaves settler 33 through line 34, is cooled in cooler 35 and then passes through pressure reduction valve 36 to cooled settler 37 which may operate at a pressure of about 300 to 350 pounds per square inch and at substantially atmospheric temperature or lower. Catalyst material settled out in the cool settler may be returned by pump 38 to reactor 27. Gases, chiefly hydrogen and hydrogen chloride with small amounts of methane, ethane, etc. leave the top of settler 37 through line 39 and the recycled by line 15 to the base of absorber 14. The liquid hydrocarbon reaction products are introduced from settler 37 by valve 40 to the upper part of hydrocarbon chloride stripper 41 which is provided with heating means 42 at its base and which may be provided with reflux means (not shown) at its top. The hydrogen chloride and light gases are thus stripped out of the products and are withdrawn through line 42 to line 15 for recycling to absorber 14.

The stripped products from the bottom of stripper 41 may be neutralized with a caustic solution and washed with water in suitable mixing and settling systems (not shown). It may then be introduced by line 43 to fractionating tower 44 which is provided with suitable reflux means 45 at its top and suitable reboiler means 46 at its base. Neohexane and lighter hydrocarbons are taken overhead through line 47 to stabilizer 48 which is likewise provided with suitable reflux and reboiler means, the stabilizer gases being withdrawn through line 49 and the isomate rich in neohexane being withdrawn through line 50.

A part of the heavier hydrocarbons withdrawn from the base or lower side stream of fractionator 44 may be returned by pump 51, cooler 52 and line 13 to the top of absorber 14. When a sufficient amount of oil is thus recycled to the absorber for recovering the hydrogen chloride from recycled gases introduced through line 15, we may introduce the feed stock through line 53 directly into reactor 21 below the point at which any hydrogen chloride is introduced thereto in order to provide a liquid scrubbing zone in the reactor 21. By this procedure the introduced feed stock scrubs hydrogen chloride from spent catalyst as said catalyst moves downwardly to discharge line 23 and at the same time any catalyst poisons which might be present in the feed stock are extracted therefrom by the downwardly moving spent complex. Thus we may utilize not only the introduced hydrogen but also the introduced charging stock for recovering valuable materials from spent catalyst and in both cases any impurities in the introduced ingredients will be scrubbed out of them before they reach that portion of the reaction chamber in which the isomerization is being effected.

Another part of the oil withdrawn from the base or side stream of fractionator 44 may be introduced by pump 51 through line 54 to slurry tank 55 into which aluminum chloride is introduced through line 56. The oil which has passed through the isomerization system is far superior to fresh charging stock for making the make-up aluminum chloride catalyst slurry. Instead of introducing the make-up aluminum chloride as a slurry it may be introduced as a paste prepared from complex withdrawn from the base of B reactor 21 through line 57. When complex is thus employed the aluminum chloride may be incorporated therein to form a paste of approximately the consistency of an ordinary tooth paste. This paste offers the unique advantage of being stable against any tendency toward settling out and it is readily dischargeable into the reaction system. The complex may act as a lubricant and hence aid in the transfer of the paste by any conventional means for handling paste-like material such as by the use of a system of blow cases. The amount of make-up aluminum chloride may be of the order of 0.5 to 2 pounds per barrel of stock charged.

In Figure 2 we have illustrated a modification of a portion of the system shown in Figure 1 which modification includes a separate scrubbing tower or drum 58. Spent complex from the bottom of reactor 21 is withdrawn through line 23 and through a pressure reduction valve 59 and line 60 to the upper part of scrubber 58, the scrubber in this case operating at a slightly higher pressure than absorber 14, i. e., of the order of about 300 pounds per square inch. Feed stock is introduced into the base of scrubber 58 for the recovery of valuable hydrogen chloride therefrom and simultaneously any impurities in the feed stock are removed by spent catalyst in this scrubber. The scrubbed feed stock may be introduced by line 12 into absorber 14, preferably through a suitable cooler (not shown) or it may be introduced by line 53 directly to the reactor by means of a suitable pump. In Figure 2 is likewise shown the step of heating hydrogen introduced through line 24 by means of heater 62 so that in the stripping zone 25 a more complete recovery of hydrogen chloride may be effected. The temperature in the base of the tower may thus be increased to 350° F. or more by the added hydrogen itself.

In Figure 3 we have shown still another modification of the initial part of the flow diagram illustrated in Figure 1. In this case the pressure in scrubber 58 may be within the general range of atmospheric to 300 pounds per square inch or more and the scrubbing with hydrogen is effected in this separate scrubber instead of in the reactor itself. Here again the hydrogen may be heated to a temperature of 300° F. or upwards in heater 62. The spent complex will be withdrawn from the scrubber 58 through line 61 as in the previous embodiment but the hot hydrogen together with recovered hydrogen chloride may be introduced by compressor 63 either through line 64 to a relatively low point in the reactor or through line 65 for introduction into the reactor with the charging stock. The embodiment illustrated in Figure 3 offers the advantage of low pressure stripping with hydrogen and the separate scrubber prevents any mixture of scrubbed, spent catalyst with catalyst in the main part of the reaction tower.

In Figure 4 we have illustrated a still further embodiment of our invention wherein the hydrogen is introduced at a low point in the reaction tower as in the case of Figure 1 and wherein recycled hydrogen is employed for scrubbing spent catalyst. The gas leaving the top of absorber 14 is chiefly hydrogen and this gas, either with or without neutralization, may be introduced by line 66 and heater 62 to the base of scrubber 58. The scrubbing may be effected at a pressure within the range of atmospheric to about 300 pounds per square inch and a temperature within the approximate range of 200 to 350° F. The gases leaving the scrubber through line 67 may be returned by compressor 68 to the base of absorber 14 along with recycled gases from line 50.

While our invention is primarily concerned with the recovery of hydrogen chloride and other valuable components of spent catalyst complex, it should be understood that either the fresh hydrogen or "used" hydrogen may likewise be employed to facilitate stripping in stripping tower 41 or in a separate zone below or following said stripping tower.

From the above description it will be seen that we have accomplished the objects of our invention and have effected the recovery of about .2 pound of hydrogen chloride per barrel of feed with no substantial added construction or operating costs. In addition to recovering valuable components from spent catalysts we purify the introduced hydrogen and prevent carbon monoxide poisoning of the catalyst complex in the reactor. The introduced feed stock itself may also be employed to aid in the recovery of valuable components from spent catalysts.

A specific example of our invention has been described along with certain modifications thereof, but it should be understood that our invention is not limited to this particular example or these particular modifications since numerous other modifications and operating conditions will be apparent from the above description to those skilled in the art.

We claim:

1. In an aluminum halide conversion process wherein hydrocarbons are contacted with an aluminum halide hydrocarbon complex under isomerization conditions in the presence of added hydrogen halide and hydrogen in a conversion zone and wherein a liquid stream from said conversion zone normally containing dissolved hydrogen halide is withdrawn from said conversion zone, the method of recovering such hydrogen halide from said stream which comprises stripping said stream with hydrogen at a point below the point of hydrogen halide addition for recovering hydrogen halide from said stream and employing said hydrogen, together with hydrogen halide which becomes associated therewith in the stripping step, in the isomerization process.

2. The method of claim 1 wherein the stream consists essentially of spent catalyst complex and wherein the stripping is effected before the spent catalyst complex is withdrawn from the conversion zone.

3. The method of claim 1 wherein the stream consists essentially of spent catalyst complex and wherein the stripping is effected after the spent catalyst complex is withdrawn from the conversion zone.

4. In a process for isomerizing $C_5$ and $C_6$ hydrocarbons by means of an aluminum chloride hydrocarbon catalyst complex promoted by hydrogen chloride wherein hydrogen is employed in a conversion zone, which hydrogen normally contains a small amount of carbon monoxide, the method of operation which comprises introducing said hydrogen into the conversion zone at a point below that at which hydrogen chloride is introduced whereby hydrogen chloride may be stripped from spent complex by the introduced hydrogen and carbon monoxide may be scrubbed out of the introduced hydrogen by spent complex.

5. The method of operating an aluminum chloride isomerization process which comprises introducing an aluminum chloride hydrocarbon complex, a hydrocarbon charging stock and hydrogen chloride into a conversion zone, withdrawing hydrocarbons together with gases and vapors from the upper part of said conversion zone, withdrawing spent catalyst from the lower part of said conversion zone to a stripping zone, introducing hydrogen at the lower part of the stripping zone, passing the hydrogen from the upper part of the stripping zone to the lower part of the conversion zone and withdrawing spent catalyst from the lower part of the stripping zone.

6. The method of claim 5 which includes the further step of countercurrently contacting spent catalyst with incoming charging stock for the recovery of hydrogen chloride and the removal from the charging stock of components deleterious to the catalyst complex.

7. The method of claim 5 wherein the hydrogen stripping step is at a temperature within the approximate range of 200 to 350° F.

8. A process for isomerizing a hydrocarbon of the $C_5$—$C_6$ boiling range with a liquid aluminum chloride-hydrocarbon complex isomerization catalyst which process comprises maintaining a column of said catalyst in a conversion zone, introducing said hydrocarbon at a low point into said column and passing said hydrocarbon upwardly through said column, introducing hydrogen chloride at a low point in said column in amounts of at least 2% by weight based on hydrocarbon introduced thereto, maintaining said conversion zone at a temperature and pressure for effecting isomerization as the main reaction, withdrawing products and gases from the upper part of the conversion zone, withdrawing substantially spent liquid complex catalyst from said conversion zone, stripping said substantially spent catalyst with a stripping gas at a temperature and pressure effective for removing hydrogen chloride from said spent complex catalyst and utilizing said removed hydrogen chloride in said conversion zone.

9. The process of claim 8 which includes the steps of introducing stripping gas into the column of complex in the conversion zone at a lower point than hydrogen chloride is introduced thereto and withdrawing stripped spent complex from the base of said column.

10. The process of claim 8 which includes the steps of withdrawing spent complex from the conversion zone, stripping the complex outside of the conversion zone and returning the hydrogen chloride from the stripping step to the conversion zone for utilization therein.

MACK SUTTON.
CECIL W. NYSEWANDER.